Nov. 13, 1934.     D. W. THOMAS     1,980,364
PIPE PROTECTOR
Filed Jan. 30, 1934

INVENTOR:
DAVID W. THOMAS
Kwis Hudson & Kent
ATTORNEYS

Patented Nov. 13, 1934

1,980,364

UNITED STATES PATENT OFFICE 1,980,364

PIPE PROTECTOR

David W. Thomas, Youngstown, Ohio, assignor to The Niles Steel Products Company, Niles, Ohio, a corporation of Ohio Application January 30, 1934, Serial No. 708,977

8 Claims. (Cl. 137—91)

This invention relates to improvements in closures for cylindrical members. While possessing other utility it has especial utility when used as a closure for the ends of steel pipe to exclude dirt and moisture from the pipe sections after they are cleaned at the mill and prior to being laid in a pipe line, such as for example, an oil pipe line.

An object of the invention is to provide a closure which may be quickly and readily positioned in the end of a cylindrical member, such as a pipe section, and which will effect an efficient seal with the member.

Another object is to provide a closure of the character above specified which may be positioned and secured in the member merely by inserting the same therein and which does not require the use of any tools to effect the mounting of the closure in the member.

A further object is to provide a closure for the ends of a cylindrical member such as a pipe section which will adapt itself to members of different internal diameters.

Additional and further objects and advantages inherent in the invention will become apparent hereinafter during the following detailed description of an embodiment of the invention which is illustrated in the accompanying drawing, wherein Figure 1 is a side elevational view of a closure constructed in accordance with the present invention;

Figure 2:
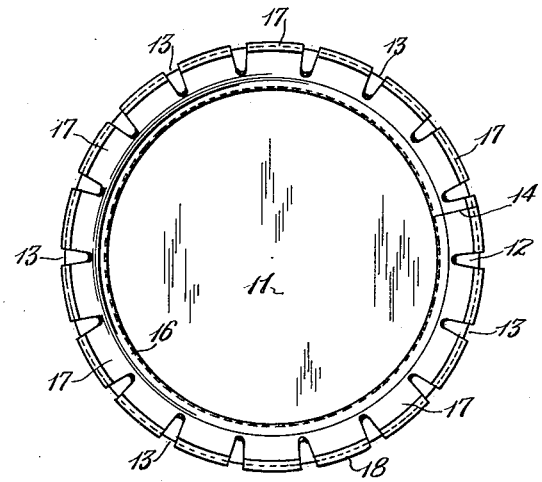
Fig. 2 is a front elevational view of the closure shown in Fig. 1, the view being taken from the left-hand side of Fig. 1.
Figure 1:
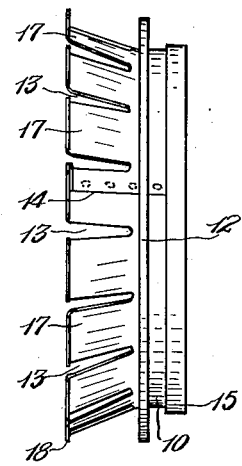

The closure is cup-shaped and comprises three main parts, namely, a side wall 10, bottom or back wall 11 and gasket 12. The construction of the closure is such that it may be readily and economically formed from metal stampings. As illustrative of the way in which the side wall 10 may be constructed, it will be observed that the side wall can be made from a sheet metal blank and a series of equally spaced reentrant recesses 13 formed in one edge of the blank. The blank may then be rolled into substantially cylindrical shape and the ends of the blank overlapped and welded together as indicated at 14. Following this operation the opposite circular edges of the blank may be provided with outstanding flanges, one of which cooperates with the rear or back wall 11 and is crimped or folded into engagement with a flange portion of said wall to form a double seal, such as indicated at 15.

An inwardly extending annular groove 16 may be rolled in the side wall 10 and the circular gasket 12 positioned therein, after which the sides of the groove 16 are bent inwardly to securely fasten the gasket in the groove. It will be noted that the closure may be simply and readily made from sheet metal stampings and thus the cost of the same can be maintained low, which is a very important consideration in closures of this character.

The side wall 10 forwardly of the groove 16, as previously stated, is provided with a series of circumferentially spaced reentrant recesses 13, thus forming a plurality of separate fingers 17, which are somewhat in the nature of spring-fingers because of the inherent resilience of the metal. These fingers 17 are outwardly flared and have at their outer ends out-turned flanges 18.

The rear or back wall 11 is so shaped that when it is mounted in the side wall 10 it will be located inwardly of the end of the side wall, and, as previously stated, it is secured to the side wall by means of the folded double seam or joint 15.

The closures may be made up for pipes of different external diameter and will be capable of being used in the same size pipe irrespective of whether the pipe has a thin wall or a thick wall, it being understood that pipes of the same external diameter often vary in their wall thickness, thus changing the internal diameter of the pipe.

Figure 4:
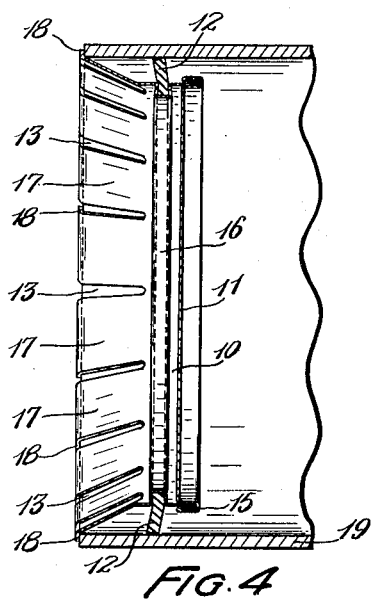
Fig. 4 is a sectional view similar to Fig. 3, the pipe section, shown therein, being of the same external diameter as the section shown in Fig. 3, but having a thin wall.

Referring to Fig. 4, the closure is shown mounted in a pipe 19 having a thin wall. In mounting the closure in the pipe 19 it is merely necessary to insert the closure into the open end of the pipe until the flanges 18 on the ends of the fingers 17 engage with the end of the pipe. There is sufficient resiliency in the fingers to maintain the closure in position in the pipe and it will be noted that the gasket 12 is sufficiently wide to engage the inner wall of the pipe and effectively seal the pipe against the entrance of moisture or dirt into the same.

Figure 3:
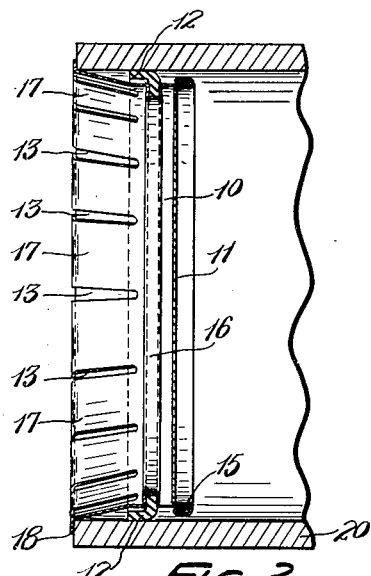
Fig. 3 is a sectional view through a pipe section with the closure mounted therein, the pipe section illustrated having a thick wall.
Figure 5:
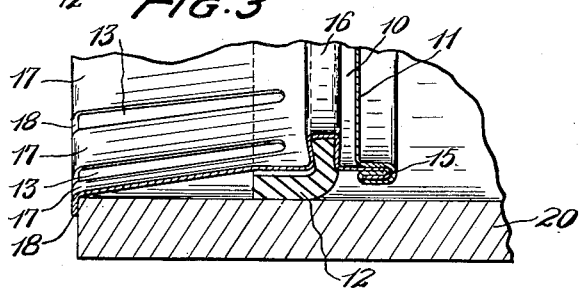
Fig. 5 is a fragmentary enlarged sectional view corresponding to Fig. 3.

In Figs. 3 and 5 the closure is shown mounted in a pipe 20 of the same external diameter as the pipe 19, but having a thick wall and therefore a smaller internal diameter. It will be noted that the closure can be mounted in the pipe 20 in the same way as it was mounted in the pipe 19, but that the fingers 17 will be deflected inwardly to adjust themselves to the internal diameter of the pipe. The gasket 12 will engage the inner wall of the pipe, but will be bent forwardly into the position shown in Figs. 3 and 5, at which time the gasket effectively seals the end of the pipe.

The closure can be inserted or positioned in the pipe ends without the employment of any tool, since the spring fingers 17 adapt themselves to the pipe and maintain the closure in position.

Although a preferred embodiment of the invention has been illustrated and described herein, it will be understood that the invention is susceptible of various modifications and adaptations within the scope of the appended claims.

Having thus described my invention, I claim:

1. A closure of the character described, comprising a sheet metal cup having its side wall provided adjacent the open end of the cup with a plurality of spaced fingers, and an annular gasket carried by said cup and projecting laterally therefrom.

2. A closure of the character described, comprising a sheet metal cup having its side wall provided adjacent its open end with a plurality of spaced fingers, said fingers being arranged to diverge outwardly, and an annular gasket carried by said cup and projecting laterally of the side wall thereof.

3. A closure of the character described, comprising a sheet metal cup having its side wall provided at its open end with a plurality of spaced fingers, said fingers diverging outwardly and being provided at their outer ends with laterally extending flanges and an annular gasket carried by said cup and projecting laterally from the side wall thereof.

4. A closure of the character described, comprising a cup having an outwardly flared side wall of resilient material, said side wall at the open end of the cup being provided with circumferentially spaced reentrant recesses forming a plurality of fingers, and compressible means on said cup adjacent the closed end thereof and projecting laterally from the side wall thereof.

5. A closure of the character described, comprising a sheet metal cup having a side wall provided at one end with a plurality of circumferentially spaced reentrant recesses forming a plurality of fingers, said fingers being outwardly flared and provided at their outer ends with lateral flanges, an annular gasket carried by said side wall inwardly of said fingers and projecting laterally from said wall, and a bottom wall secured to said side wall rearwardly of said gasket.

6. A closure of the character described, comprising a cup member having a resilient side wall outwardly flared toward the open end of the member, and an annular gasket carried by said member and projecting laterally of the side wall thereof, said gasket being of a width such that its outer edge and the open end of the member lie substantially in the circumference of the same cylinder.

7. A closure of the character described, comprising a sheet metal cup member having a side wall provided with an annular groove inwardly of the open end of the member, and an annular gasket arranged in said groove and projecting laterally of the side wall of said member, the side walls of said groove being pressed inwardly into engagement with said gasket to retain the latter therein.

8. A closure of the character described comprising a circular member having compressible and flexible means adjacent its circumference adapted to engage the inner wall of a pipe inwardly of the end thereof to form a seal therewith, and a plurality of outwardly divergent resilient fingers extending in a substantially axial direction from said member and provided at their outer ends with means adapted to engage the end of the pipe.

DAVID W. THOMAS.